(12) United States Patent
Yamamori

(10) Patent No.: US 9,849,965 B2
(45) Date of Patent: Dec. 26, 2017

(54) MANUFACTURING METHOD OF REINFORCED STRUCTURE

(71) Applicant: MITSUBISHI HEAVY INDUSTRIES, LTD., Tokyo (JP)

(72) Inventor: Taku Yamamori, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/901,822

(22) PCT Filed: Jun. 26, 2014

(86) PCT No.: PCT/JP2014/067008
§ 371 (c)(1),
(2) Date: Dec. 29, 2015

(87) PCT Pub. No.: WO2015/005125
PCT Pub. Date: Jan. 15, 2015

(65) Prior Publication Data
US 2016/0368583 A1 Dec. 22, 2016

(30) Foreign Application Priority Data
Jul. 12, 2013 (JP) .................................. 2013-146641

(51) Int. Cl.
*B64C 1/12* (2006.01)
*B29C 70/06* (2006.01)
(Continued)

(52) U.S. Cl.
CPC ................ *B64C 1/12* (2013.01); *B29C 70/06* (2013.01); *B29C 70/882* (2013.01); *B64C 1/064* (2013.01);
(Continued)

(58) Field of Classification Search
CPC ...... B29C 70/882; B64D 45/02; B64D 37/32; B64C 1/064; B64C 1/12; B64F 5/10
See application file for complete search history.

(56) References Cited

U.S. PATENT DOCUMENTS 7,740,434 B2  6/2010 Kamino et al.
8,821,666 B2  9/2014 Bechtold et al.
(Continued)

FOREIGN PATENT DOCUMENTS

DE    102007015517 A1   10/2008
EP       1772376 A2      4/2007
(Continued)

OTHER PUBLICATIONS

PCT/IB/338, "Notification of Transmittal of Translation of the International Preliminary Report on Patentability for International Application No. PCT/JP2014/067014", dated Jan. 21, 2016.
(Continued)

*Primary Examiner* — John Goff
(74) *Attorney, Agent, or Firm* — Manabu Kanesaka; Benjamin Hauptman; Kenneth Berner

(57) ABSTRACT

A manufacturing method of a reinforced structure includes a step of preparing a stringer that has a fiber exposed surface, a step of disposing an electrically conductive protection member on the fiber exposed surface to cover at least a part of the fiber exposed surface, a step of arranging the stringer on a skin having an uncured resin component, and a step of curing the skin after the arranging. The electrically conductive protection member includes a composite material made of combination of a resin component and an electrically conductive fiber component. The step of curing includes curing the skin and the electrically conductive protection (Continued)

member simultaneously. The manufacturing method can prevent edge glow without increasing the number of production steps.

6 Claims, 5 Drawing Sheets

(51) Int. Cl.
| | | |
|---|---|---|
| *B64D 45/02* | (2006.01) | |
| *B64C 1/06* | (2006.01) | |
| *B29C 70/88* | (2006.01) | |
| *B64F 5/10* | (2017.01) | |
| *B64C 1/00* | (2006.01) | |
| *B29K 105/08* | (2006.01) | |
| *B29K 307/04* | (2006.01) | |
| *B29L 31/30* | (2006.01) | |

(52) U.S. Cl.
CPC ............... *B64D 45/02* (2013.01); *B64F 5/10* (2017.01); *B29K 2105/08* (2013.01); *B29K 2307/04* (2013.01); *B29K 2995/0005* (2013.01); *B29L 2031/3085* (2013.01); *B64C 2001/0072* (2013.01); *Y02T 50/433* (2013.01)

(56) References Cited

U.S. PATENT DOCUMENTS

| | | | |
|---|---|---|---|
| 8,911,580 | B2 | 12/2014 | Law et al. |
| 2008/0128430 | A1 | 6/2008 | Kovach et al. |
| 2010/0124659 | A1* | 5/2010 | Nelson ............... B29C 35/0266 428/411.1 |
| 2010/0139847 | A1 | 6/2010 | Law et al. |
| 2010/0147460 | A1* | 6/2010 | Lefebure ............... B29C 65/02 156/307.1 |
| 2011/0278395 | A1 | 11/2011 | Telgkamp et al. |
| 2012/0043019 | A1* | 2/2012 | Belpaire ............. B29C 44/1228 156/293 |
| 2012/0100343 | A1* | 4/2012 | Borghini-Lilli ......... B29C 70/30 428/156 |
| 2013/0168009 | A1 | 7/2013 | Cebolla Garrofe et al. |
| 2013/0236692 | A1 | 9/2013 | Tanaka et al. |
| 2013/0277372 | A1 | 10/2013 | Waku |
| 2015/0165742 | A1* | 6/2015 | Reese, Jr. ............... B32B 7/045 156/64 |
| 2016/0368583 | A1 | 12/2016 | Yamamori |
| 2016/0368584 | A1 | 12/2016 | Yamamori |

FOREIGN PATENT DOCUMENTS

| | | |
|---|---|---|
| EP | 2610047 A1 | 7/2013 |
| EP | 3020539 A1 | 5/2016 |
| EP | 3020540 A1 | 5/2016 |
| JP | 2010-523357 A | 7/2010 |
| JP | 2012-162147 A | 8/2012 |
| JP | 2012-187808 A | 10/2012 |
| WO | 2008/019894 A1 | 2/2008 |
| WO | 2008/119701 A1 | 10/2008 |
| WO | 2015/005125 A1 | 1/2015 |
| WO | 2015/005126 A1 | 1/2015 |

OTHER PUBLICATIONS

PCT/IB/373, "International Preliminary Report on Patentability for International Application No. PCT/JP2014/067014," dated Jan. 12, 2016.
PCT/ISA/237, "Written Opinion of the International Searching Authority for International Application No. PCT/JP2014/067014," dated Sep. 9, 2014.
PCT/IB/326, "Notification Concerning Transmittal of International Preliminary Report on Patentability for International Application No. PCT/JP2014/067014," dated Jan. 21, 2016.
PCT/IB/338, "Notification of Transmittal of Translation of the International Preliminary Report on Patentability for International Application No. PCT/JP2014/067008," dated Jan. 21, 2016.
PCT/IB/373, "International Preliminary Report on Patentability for International Application No. PCT/JP2014/067008," dated Jan. 12, 2016.
PCT/ISA/237, "Written Opinion of the International Searching Authority for International Application No. PCT/JP2014/067008," dated Sep. 2, 2014.
PCT/IB/326, "Notification Concerning Transmittal of International Preliminary Report on Patentability for International Application No. PCT/JP2014/067008," dated Jan. 21, 2016.
PCT, "International Search Report for International Application No. PCT/JP2014/067008".
PCT, "International Search Report for International Application No. PCT/JP2014/067014".
Canada Patent Office, "Office Action for Canadian Patent Application No. 2917796," dated Nov. 22, 2016.
Canada Patent Office, "Office Action for Canadian Patent Application No. 2917127," dated Dec. 8, 2016.
USPTO, "Office Action for U.S. Appl. No. 14/901,830," dated Jan. 17, 2017.
Europe Patent Office, "Search Report for European Patent Application No. 14823339.8," dated Mar. 1, 2017.
Europe Patent Office, "Search Report for European Patent Application No. 14822710.1," dated Mar. 8, 2017.
USPTO, "Final Office Action for U.S. Appl. No. 14/901,830," dated May 10, 2017.

* cited by examiner

MANUFACTURING METHOD OF REINFORCED STRUCTURE

TECHNICAL FIELD

The present invention relates to a manufacturing method of a reinforced structure.

BACKGROUND ART

There is a case in which a fiber reinforced composite material (for example, carbon fiber reinforced plastic; CFRP) made of combination of a fiber component and a resin component is used for a skin (an outer plate) in a main wing member etc. of an aircraft. There is a case in which a stringer (longitudinal penetrating member) is attached to the skin to increase strength. The skin to which the stringer is attached is hereinafter referred to as a reinforced structure. There is a case in which the fiber reinforced composite material is used for the stringer as well as the skin.

In manufacturing the reinforced structure, a cured stringer is disposed on an uncured skin via adhesive. Then, the skin is cured with heat, pressure etc. and the stringer is bonded integrally to the skin.

Note that there is a case in which the cured stringer is processed before being placed on the skin for size adjustment etc. If the processing has been performed, the fiber components are exposed from a processed surface. In other words, a fiber exposed surface is formed in a part of the stringer. There is a case in which current or voltage is applied to the reinforced structure during operation. For example, if the reinforced structure is used as the main wing member of the aircraft, there is a case in which lightning current or high voltage is applied by lightning etc. Thus, there is a case in which edge glow occurs in the fiber exposed surface.

Techniques for preventing the edge glow are disclosed in Patent Literature 1 (US Patent Publication No. 2008/0,128, 430). Patent Literature 1 discloses an idea of applying an edge seal made of a thermosetting resin to the fiber exposed surface, an idea of curing the applied edge seal, an idea in which the edge seal includes carbon fibers and so on.

CITATION LIST

Patent Literature

Patent Literature 1: US 2008/0,128,430 A1

SUMMARY OF THE INVENTION

If the fiber exposed surface is sealed by the edge seal as described in Patent Literature 1, a step of curing a thermosetting resin layer is required. Therefore, the number of manufacturing processes is increased.

On the other hand, it is conceivable that the stringer is adhered to the skin, and a seal material such as a rubber material is applied to the fiber exposed surface after curing the skin. However, even in this case, the number of manufacturing processes increased in order to apply the seal material. In addition, the number of parts is increased.

Thus, an object of the present invention is to provide a manufacturing method of a reinforced structure which can prevent the edge glow without increasing the number of manufacturing processes.

A manufacturing method of a reinforced structure according to some embodiments of the present invention includes a step of preparing a stringer that has a fiber exposed surface, a step of disposing an electrically conductive protection member on the fiber exposed surface to cover at least a part of the fiber exposed surface, a step of arranging the stringer on a skin having an uncured resin component, and a step of curing the skin after the step of arranging the stringer. The electrically conductive protection member includes a composite material made of combination of a resin component and an electrically conductive fiber component. The step of curing the skin includes curing the skin and the electrically conductive protection member simultaneously.

According to the present invention, the manufacturing method of the reinforced structure which can prevent the edge glow without increasing the number of manufacturing processes is provided.

DESCRIPTION OF EMBODIMENTS

With reference to the drawings, some embodiments will be explained below.

First Embodiment

Figure 1:
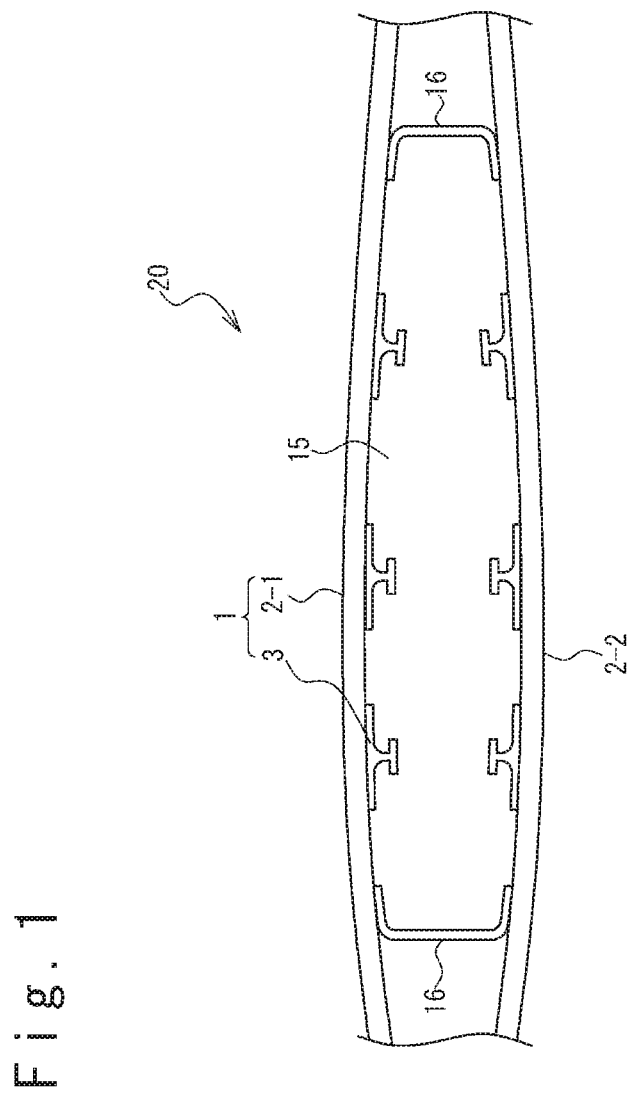
FIG. 1 is a schematic cross sectional view of a main wing member to which a reinforced structure according to the first embodiment is applied.

FIG. 1 is the schematic cross sectional view of the main wing member 20 to which the reinforced structure 1 according to the first embodiment of the present invention is applied. As shown in FIG. 1, the main wing member 20 has a pair of skins 2 (2-1, 2-2) and spars 16. The spars 16 are located between the skin 2-1 and the skin 2-2. A fuel tank 15 is formed by an enclosed region which is enclosed by the skin 2-1, the skin 2-2 and the spars 16. In addition, a stringer 3 is bonded to the skin 2. Thereby, the reinforced structure 1 is formed. In other words, the reinforced structure 1 includes the skin 2 and the stringer 3.

The skin 2 and stringers 3, respectively, are made of fiber reinforced composite material. In the present embodiment, a material made of combination of a fiber component and a thermosetting resin component is used as the fiber reinforced composite material. For example, a carbon fiber reinforced plastic material is used as the fiber reinforced composite material.

Note that if there is a fiber exposed surface in the stringer 3, there is a case in which the edge glow occurs as already described. If the fiber exposed surface exists in the fuel tank 15, there exists a possibility that fuel is ignited by the edge glow. Therefore, for the stringer 3 arranged in the fuel tank 15, preventing the edge glow is particularly required.

Figure 2:
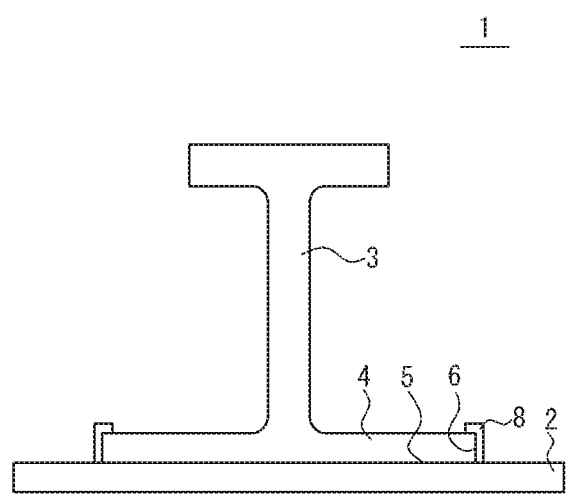
FIG. 2 is a schematic cross sectional view of the reinforced structure.

FIG. 2 is the schematic cross sectional view of the reinforced structure 1. As described above, the reinforced structure 1 has the skin 2 and the stringer 3.

The stringer 3 includes a plate portion 4. The plate portion 4 has an adhesive surface 5 and an end surface 6, and the plate portion 4 is bonded to the skin 2 at the adhesive surface 5. The end surface is a processed portion which is processed after curing the stringer 3, and the end surface has become a fiber exposed surface.

The stringer 3 is provided with a protection layer 8 to cover the end surface 6. Because the stringer is provided with the protection layer 8, the fiber component exposed at the fiber exposed surface is protected. Thus, the edge glow discharge is prevented.

Figure 3:
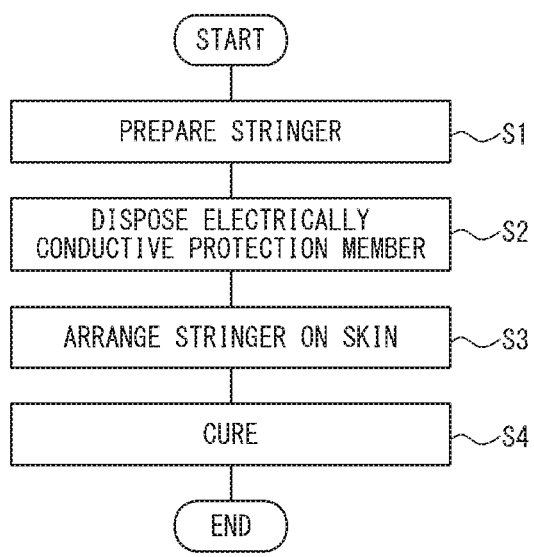
FIG. 3 is a flow chart indicating a manufacturing method of the reinforced structure.

Subsequently, a manufacturing method of the reinforced structure 1 according to the present embodiment will be explained. FIG. 3 is the flow chart indicating the manufacturing method of the reinforced structure 1.

Step S1: Preparation of Stringer

At first, cured stringer 3 is prepared. As already described, the stringer 3 includes the fiber component and the resin component, and the fiber component is impregnated with the resin component. A surface of the stringer 3 is covered with the resin component. The cured stringer 3 is processed for the purpose of the size adjustment etc. In the present embodiment, the end surface 6 is processed. Thus, the end surface 6 becomes the fiber exposed surface.

Step S2; Disposition of Electrically Conductive Protection Member

Figure 4:
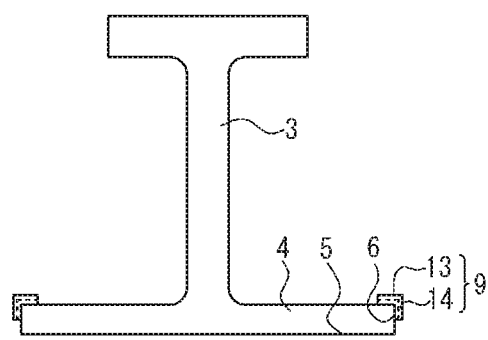
FIG. 4 is a schematic cross sectional view of the reinforced structure in a manufacturing process.

Next, as shown in FIG. 4, an electrically conductive protection member 9 is applied to (disposed on) the stringer 3. The electrically conductive protection member 9 is pasted to the end surface 6 so as to cover at least a part of the end surface 6.

A composite material made of combination of an uncured thermosetting resin component 13 and an electrically conductive fiber component 14 is preferably used as the electrically conductive protection member 9. More specifically, in the present embodiment, a carbon fiber component is used as the fiber component 14. That is, an uncured carbon fiber reinforced plastic material is used as the electrically conductive protection member 9.

Figure 5:
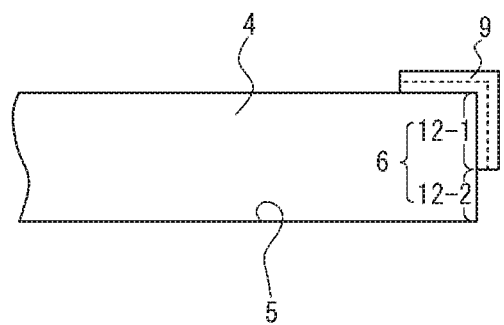
FIG. 5 is a schematic cross sectional view of the reinforced structure in the manufacturing process.

FIG. 5 is a schematic cross sectional view indicating a configuration of the end surface 6. In this step, the electrically conductive protection member 9 is applied to only a part of the end surface 6 such that the electrically conductive protection member 9 and the adhesive surface 5 are separated from each other. In other words, the electrically conductive protection member 9 is applied so as to form a covered region 12-1 and an exposed region 12-2 in the end surface 6. The covered region 12-1 is a region which is covered with the electrically conductive protection member 9. On the other hand, the exposed region 12-2 is a region where the end surface 6 is exposed. The exposed region 12-2 is formed between the covered region 12-1 and the adhesive surface 5.

Note that, the exposed region 12-2 is set in a portion which is to be covered with an adhesive 10 flowing out as described later.

Step S3; Arrangement of Stringer on Skin

Figure 6:
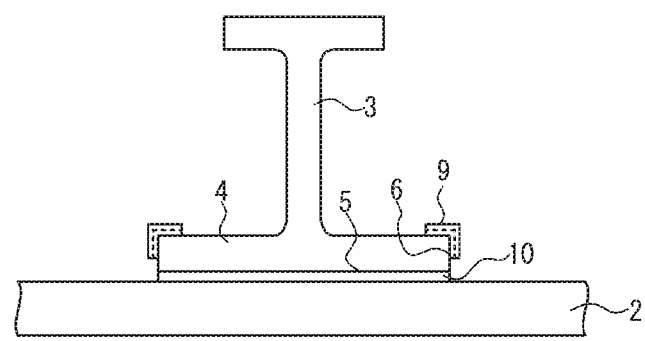
FIG. 6 is a schematic cross sectional view of the reinforced structure in the manufacturing process.

Subsequently, as shown in FIG. 6, the stringer 3 is arranged on an uncured skin 2. More specifically, firstly, the adhesive 10 is applied to the adhesive surface 5. Then, the stringer 3 is arranged on the skin 2 such that the adhesive surface 5 sticks to the skin 2.

Note that a thermosetting resin sheet is preferably used as the adhesive 10.

Step S4; Curing

Next, the skin 2 and the electrically conductive protection member 9 are cured at the same time. That is, the respective resin components of the skin 2 and the electrically conductive protection member 9 are cured simultaneously. The skin 2 and the electrically conductive protection member 9 are cured with, for example, heat and pressure. At this time, the adhesive 10 is also cured. Thus, the stringer 3 is integrally bonded to the skin 2, and the reinforced structure 1 is obtained.

Figure 7:
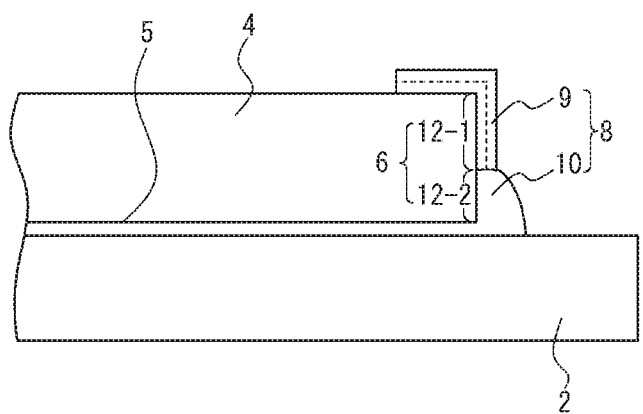
FIG. 7 is a schematic cross sectional view of the reinforced structure in the manufacturing process.

During curing, the adhesive 10 flows out from an end portion of the plate portion 4. As a result, as shown in FIG. 7, the exposed region 12-2 in the end surface 6 is covered with the adhesive 10 which has been flowing out. That is, the end surface 6 is covered with the electrically conductive protection member 9 and the adhesive 10, and the protection layer 8 is formed. Flowing out of the adhesive 10 normally causes an obstacle in an operation in a subsequent step, but in the present embodiment, the flowing out is used on the contrary.

By the method described above, the reinforced structure 1 according to the present embodiment can be obtained. In the reinforced structure 1, the covered region 12-1 in the fiber exposed surface (end surface 6) is protected by the electrically conductive protection member 9. Therefore, even when electric energy is applied to the reinforced structure 1, the electric energy is released to the electrically conductive protection member 9 before a spark occurs. Moreover, the exposed region 12-2 is insulated by the adhesive 10. Therefore, the edge glow can be prevented.

Further, according to the present embodiment, the curing of the electrically conductive protection member 9 and the curing of the skin 2 are executed in the same step. It is possible to seal the fiber exposed surface (end surface 6) without adding a process for curing the electrically conductive protection member 9. That is, without increasing the number of manufacturing processes, it is possible to obtain the reinforced structure which can prevent the edge glow.

Further, according to the present embodiment, in step S2, the electrically conductive protection member 9 is applied to only a part of the end surface 6 such that the electrically conductive protection member 9 and the adhesive surface 5 are separated from each other. Thereby, it is possible to prevent the fiber component of the electrically conductive protection member 9 from entering between the adhesive surface 5 and the skin 2. Depending on the type of the electrically conductive protection member 9, there is a case in which the strength of the reinforced structure 1 is decreased by the insertion of the fiber component. In contrast, according to the present embodiment, since the insertion of the fiber component is prevented, it is possible to prevent the decrease in strength of the reinforced structure 1.

Note that, in the present embodiment, the case in which the carbon fiber reinforced plastic material is used as the electrically conductive protection member 9 has been explained. The carbon fiber reinforced plastic material has a high strength. Therefore, even when the carbon fiber which is the fiber component is entered between the adhesive surface 5 and the skin 2, the strength of the reinforced structure 1 is not decreased. From this viewpoint, the carbon fiber reinforced plastic material is preferably used as the electrically conductive protection member 9.

However, the carbon fiber reinforced plastic material may not necessarily be used as the electrically conductive protection member 9. It is possible to use another material as long as it is made of composite material in which the thermosetting resin component 13 and the electrically conductive fiber component 14 are combined. In particular, as compared to the case of covering the fiber exposed surface with an insulating material, in this embodiment, since the electrically conductive protection member 9 is used, it allows a wider choice of materials.

Note that, in the present embodiment, semiconductor is also included in the "electrically conductive fiber component 14". For example, instead of the carbon fiber, it is possible to use SiC fiber etc., which is semiconductor, as the fiber component 14 included in the electrically conductive protection member 9.

Note that, in the present embodiment, the reinforced structure 1 which is applied to the fuel tank 15 of the main wing member 20 has been explained. However, the reinforced structure 1 may not necessarily be used for the fuel tank 15. The reinforced structure is preferably used for other purposes if it is required to prevent the edge glow.

Note that, it is preferable that the resin component included in the skin 2, the resin component included in the stringer 3, the resin component 13 included in the electrically conductive protection member 9, and the adhesive 10 are the same material. If these components are the same material, physical properties of each part become closer to one another and thereby it is possible to increase the strength of the entire reinforced structure 1. It is possible to use, for example, epoxy resin, acrylic resin etc. as these resin components.

Note that, in the present embodiment, the stringer 3 is arranged on the skin 2 after the electrically conductive protection member 9 is applied to the stringer 3 (after the step S2). However, the electrically conductive protection member 9 may be applied to the stringer 3 after the stringer 3 is arranged on the skin 2. Even in this case, it is possible to cure the skin 2 and the electrically conductive protection member 9 in the same step.

Second Embodiment

Next, the second embodiment will be explained. In this embodiment, as compared with the first embodiment, an application position of the electrically conductive protection member 9 has been changed. With respect to the other points, since it is possible to adopt similar or the same configurations as those of the first embodiment, detailed explanation thereof will be omitted.

Figure 8:
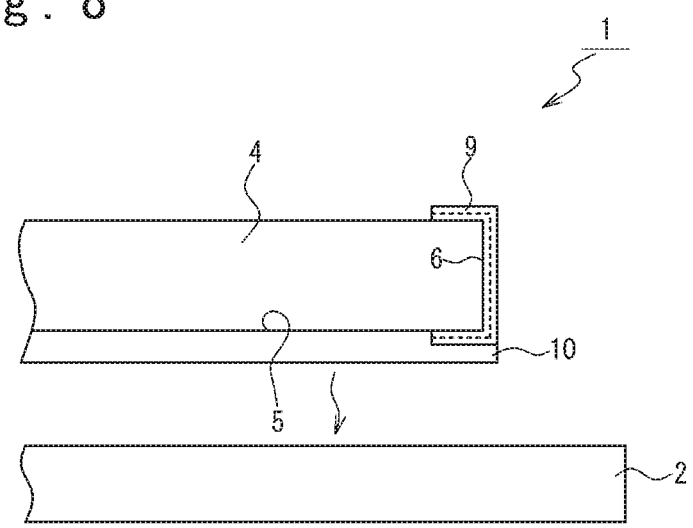
FIG. 8 is a schematic cross sectional view of the reinforced structure in the manufacturing process.

In the present embodiment, in step S2, as shown in FIG. 8, the electrically conductive protection member 9 is applied to cover the entire end surface 6. That is, the electrically conductive protection member 9 is also applied to a part of the adhesive surface 5. Then, the adhesive 10 is applied to the adhesive surface 5, and the stringer 3 is placed on the skin 2 (step S3). Then, the skin 2 and the electrically conductive protection member 9 are cured (step S4).

According to the present embodiment, since the fiber exposed surface (end surface 6) is completely covered with the electrically conductive protection member 9, it is possible to prevent more reliably the edge glow.

Note that, in the present embodiment, the electrically conductive protection member 9 is inserted in a part between the skin 2 and the plate portion 4. If an insulating material such as glass fiber is inserted between the skin 2 and the plate portion 4, there exists a case in which the strength of the reinforced structure 1 is decreased. However, in the case in which a high strength material such as carbon fiber reinforced plastic material is used as the electrically conductive protection member 9, the strength of the reinforced structure 1 is not decreased even if the electrically conductive protection member 9 is inserted between the skin 2 and the plate portion 4.

The present invention has been explained with reference to the first to the third embodiments. It should be noted that these embodiments may not necessarily be independent of each other, and it is possible to combine these embodiments as long as the technical contradiction does not occur.

This application claims a priority based on Japanese Patent Application No. JP2013-146641. The disclosure of which is hereby incorporated by reference herein in its entirety.

The invention claimed is:

1. A manufacturing method of a reinforced structure comprising:
    preparing a cured stringer having a plate portion and formed of a composite material, wherein the plate portion has an adhesion surface to be adhered to a skin, and has at least one of side end surfaces extending along a longitudinal direction of the stringer, and the at least one of the side end surfaces functions as a fiber exposed surface extending in a thickness direction of the plate portion from the adhesion surface;
    disposing an uncured electrically conductive protection member on a part of the fiber exposed surface such that the electrically conductive protection member is separated from the adhesion surface;
    applying an adhesive material on the adhesion surface;
    arranging the stringer applied with the adhesive material on the skin having an uncured resin component; and
    curing the skin arranged with the cured stringer and the electrically conductive protection member simultaneously such that the adhesive material flows out from an end portion of the plate portion, and the electrically conductive protection member and the adhesive material flowing out from the end portion cover the fiber exposed surface,
    wherein the electrically conductive protection member includes a composite material made of combination of a resin component and an electrically conductive fiber component.

2. The manufacturing method according to claim 1, wherein the electrically conductive fiber component includes a carbon fiber.

3. The manufacturing method according to claim 1, wherein the preparing a cured stringer includes:
    preparing a cured carbon fiber reinforced plastic material; and
    obtaining the stringer by processing a part of the cured carbon fiber reinforced plastic material.

4. The manufacturing method according to claim 1, wherein the skin includes a carbon fiber reinforced plastic material.

5. The manufacturing method according to claim 1, wherein the curing includes curing the skin and the electrically conductive protection member with heat and pressure.

6. The manufacturing method according to claim 1, wherein in the step of disposing the uncured electrically conductive protection member on the part of the fiber exposed surface, the electrically conductive protection member is disposed on a corner between an upper surface and the at least one of the side end surfaces of the plate portion and apart from the adhesion surface to expose a lower portion of the at least one of the side end surfaces, and
    in the step of curing the skin and the electrically conductive protection member, the adhesive material flowing out from the end portion of the plate portion extends between the skin and a lower portion of the electrically conductive protection member to cover the lower portion of the at least one of the side end surfaces.

\* \* \* \* \*